US011870257B1

(12) United States Patent
Zomorrodian

(10) Patent No.: US 11,870,257 B1
(45) Date of Patent: Jan. 9, 2024

(54) IMPEDANCE CONTROL TRANSFORMER ASSEMBLY

(71) Applicant: Pacific Transformer Corporation, Anaheim, CA (US)

(72) Inventor: Vahid Zomorrodian, Anaheim, CA (US)

(73) Assignee: PACIFIC TRANSFORMER CORPORATION, Anaheim, CA (US)

( * ) Notice: Subject to any disclaimer, the term of this patent is extended or adjusted under 35 U.S.C. 154(b) by 298 days.

(21) Appl. No.: 17/334,453

(22) Filed: May 28, 2021

(51) Int. Cl.
*H02J 3/14* (2006.01)
*H01F 38/14* (2006.01)
*H01F 27/42* (2006.01)

(52) U.S. Cl.
CPC ............... *H02J 3/14* (2013.01); *H01F 27/42* (2013.01); *H01F 38/14* (2013.01)

(58) Field of Classification Search
CPC ............ H02J 3/14; H01F 27/42; H01F 38/14
USPC ........................................................ 323/212
See application file for complete search history.

(56) References Cited

U.S. PATENT DOCUMENTS

| | | | |
|---|---|---|---|
| 6,434,024 B2 | 8/2002 | Shirato | |
| 7,646,275 B2 | 1/2010 | West | |
| 8,664,804 B2 | 3/2014 | Cruz et al. | |
| 2004/0246085 A1* | 12/2004 | West | H02J 9/005 336/96 |
| 2010/0109431 A1* | 5/2010 | West | H02J 9/005 307/17 |
| 2012/0019963 A1* | 1/2012 | West | H02J 9/005 361/36 |
| 2014/0058575 A1* | 2/2014 | Ashworth | B60L 53/63 700/297 |

* cited by examiner

*Primary Examiner* — Yemane Mehari
(74) *Attorney, Agent, or Firm* — Buchalter, A Professional Corporation

(57) ABSTRACT

An impedance control transformer assembly includes and/or may be coupled with a main transformer having a nominal impedance, the assembly configured to be coupled to an electrical source and a distribution load. The assembly includes actuatable bypass contactors that couple the main transformer in a series circuit to a high-Z transformer configured to establish a combined impedance that exceeds the nominal impedance. Also included is a current sensor coupled to an output of the main transformer and which detects power demand of the distribution load. At least one processor is coupled to the current sensor and the bypass contactors, and are configured to actuate the bypass contactors responsive to detection of a predetermined power demand. When the distributed loads require less than the predetermined power demand, the processor automatically opens the bypass contactors to couple the main and high-Z transformers, which establishes a combined, increased impedance and a low power mode that decreases power consumption of the impedance control transformer assembly.

20 Claims, 4 Drawing Sheets

IMPEDANCE CONTROL TRANSFORMER ASSEMBLY

TECHNICAL FIELD

The disclosure is directed to impedance control transformer assemblies and similarly enabled power distribution and or isolation transformers that are configured to reduce off-peak transformer power consumption during periods of time when distributed power consumption loads decrease.

BACKGROUND

In the field of electrical power generation, conversion, transmission, and distribution, various types of transformers are utilized to change and control voltages and currents. During generation of electricity, voltages are increased to enable more efficient transmission from power generation sources to geographically widespread distribution systems and intermediate stations and substations, which further condition electrical power for distribution to industrial, commercial, and residential end users. Every such station, substation, commercial, industrial, and residential neighborhood distribution subsystem incorporates one or more electrical power isolation and or distribution transformers, which are configured to control, convert, and or condition voltages and currents to enable end user consumption.

In some applications, isolation and distribution transformers are configured to convert mains or grid voltages and currents into different voltages and currents, as may be needed at the service entrance isolation transformer by such commercial, industrial, and or residential users. In some arrangements, source or mains or grid high voltages and low currents are converted by step down and/or isolation transformers into comparatively lower voltages and higher currents for distribution and consumption. In some applications, additional downstream transformers are utilized solely to isolate end user electrical systems from mains power sources without changing voltages or currents, which can prevent power disturbances and or fluctuations on either side of the isolation transformer from affecting the other side.

Such distribution and isolation transformers have many configurations that can include for example without limitation oil-cooled and dry transformers, among others. Such transformers can also be configured for single and multi-phase alternating current operation and 50 to 400 or more cycles per second or Hertz, and to operate with ratings between 100 volt-amperes (VA) and 500 kilo-volt-amperes (KVA) or more or less. Depending upon the preferred application, such transformers may incorporate what is sometimes referred to by those skilled in the art as Delta-Delta, Delta-Wye, Wye-Delta, Wye-Wye, and or other and combination primary to secondary transformer winding and flux coupling configurations.

Some of those knowledgeable in the relevant fields of technology have come to accept that while inefficient because some power is lost to heating during conversion and distribution, such distribution and isolation transformers are suitable for use in most circumstances. Such individuals have also come to accept that due to their less-than-optimal efficiency, such distribution and isolation transformers consume a substantial amount of electrical power even during off-peak or low demand periods of operation.

Such power consumption is due to the transformer excitation current that persists in the primary winding, even while there is an insubstantial or decreased or even no load being drawn by the secondary winding and distribution loads. In some commercial and industrial circumstances, off-peak electrical power requirements such as during late evening and early morning can decrease by as much as 95% or more or less, compared to normal use such as during daylight and or normal workday hours. Residential neighborhood power utilization can fluctuate in similar ways, wherein night time and mid-day use decreases substantially due to sleep and or away-from-home work hours, compared to early morning and evenings when residents are home.

In the past, the most common solution to prevent power consumption during off-peak or no load circumstances requires mechanical disconnection of the transformer primary winding from the grid or mains source. Unfortunately, disconnecting these transformers is not feasible under many circumstances. For example, for many industrial, commercial, and residential neighborhood applications, even during off-peak or insubstantial load conditions, there may be many refrigeration systems, computers, emergency lights, alarm systems, and/or other low power equipment that remains online and in need of electrical power.

Consequently, when there is little or no demand from such isolation and distribution transformers, a substantial amount of electric power is consumed by the primary windings. Regardless of whether downstream and or distributed electrical loads create demand for power, prior art transformers will always consume some minimum amount of power, which is often characterized by a nominal excitation current that is consumed at the source voltage. Other prior systems require mechanical switching components that switch grid power and consumer distribution systems between transformers having different ratings, such that less power is consumed during off-peak hours, by use of a lower rated transformer. However, this possible solution requires substantially increased expenses related to the required extra switching equipment, multiple transformers, and related wiring and the maintenance costs associated therewith.

Despite the long known issue with high power consumption by such legacy transformers, even during off-peak, insubstantial, and no load conditions, the undesirable power consumption problems persist. Because such transformers cannot be disconnected from grid or mains power sources even during the known off-peak time spans, improvements have long been needed to reduce such power consumption, and to enable new ways to conserve energy. Improvements are also needed for applications directed to disconnected transformers, because unexpected and or undetected changes in power requirements can require such mechanically disconnected transformers to be rapidly re-connected, which presents challenges.

What has long been needed but which remains unavailable are new devices and methods for automatically enabling electrical power conversion and isolation transformers to supply continuous power as needed, but which can have new modes of operation that enable power conservation during off-peak periods of time when insubstantial or no load conditions arise. Also needed but previously unavailable, are new ways to rapidly and automatically enable new, improved transformers to supply full power upon demand without the need for expensive and complex mechanical disconnection, switching, and multiple transformer systems.

SUMMARY

The disclosure is directed to improved systems and methods for enabling power conservation and automated operation of new isolation, step down, and conversion transformers and systems and methods of operation.

In arrangements of the new systems and methods of the disclosure, an impedance control transformer assembly is contemplated, which may be coupled to and/or include a main transformer that has a nominal operating impedance, such that the main transformer is configured to be coupled to an electrical source such as a mains or grid power source, and also to at least one distribution load. Also included is a high impedance or "high-Z" transformer that is configured to be coupled in a series circuit to the main transformer, which establishes a combined impedance and increases impedance above the nominal impedance during operation.

Further, the main and high-Z transformers are configured to be coupled in the series circuit by actuation of bypass contactors, which close and open to respectively couple and decouple the main and high-Z transformers. Described differently, the bypass contactors are configured when open to couple the main and high-Z transformers in series establishing a combined and or increased impedance, which exceeds the nominal operating impedance of the main transformer operating in a stand-alone configuration. One or more current sensors are also incorporated in the impedance control transformer assembly, which are coupled to secondary winding(s) of the main transformer, and are configured to detect power demand of the at least one distribution load.

The impedance control transformer assembly also includes or is configured to be in communication with at least one and/or one or more hardware processors, which are coupled to various components including, for example without limitation, the current sensor(s) and bypass contactors. The processor or processors are configured, among other capabilities, to actuate and close the bypass contactors in response to power demand changes detected by the current sensor(s).

In variations, the one or more processors are optionally configured to open the bypass contactors when the detected power demand is less than a predetermined threshold, such as during off-peak hours of operation, which enables the impedance control transformer assembly to establish a low power mode of operation. In this arrangement, the one or more processors also may be configured to close the bypass contactors to decouple or bypass the high-Z transformer when the detected power demand equals or exceeds a predetermined threshold, to establish a full power mode for the impedance control transformer assembly.

The disclosure also contemplates modifications wherein the impedance control transformer assembly is arranged with the main and high-Z transformers configured as single-phase alternating current transformers that have respective input primary windings that during operation are coupled to the electrical source, and to have respective output secondary windings that may be coupled to the at least one distribution load. In this variation, the bypass contactors incorporate respective primary and secondary contactors that each are configured to be actuatable to couple and decouple the main and high-Z transformers.

In other adaptations, the disclosure is directed to the impedance control transformer assembly incorporating main and high-Z transformers that are configured as three-phase alternating current transformers, which have respective input primary windings for each phase that are configured to be coupled to the electrical source. Also included are respective output secondary windings for each phase, in which at least one phase is configured to be coupled to at least one distribution load. These arrangements further contemplate that the bypass contactors include respective primary contactors for the primary windings for each phase, as well as respective secondary contactors for the secondary windings for each phase.

Modifications of the disclosure are also directed to the impedance control transformer assembly configured wherein during operation the high-Z transformer, when coupled in the series circuit to establish an increased combined impedance and a low power mode, decreases the power consumed from the electrical source by the main transformer compared to operation of the impedance control transformer assembly in a full power mode. In similar exemplary variations, the main transformer is configured to have a nominal excitation current during operation in a full power mode.

Here, a reduced excitation current less than the nominal is established responsive to the high-Z transformer being coupled in the series circuit with the main transformer resulting from the increased, combined impedance. In still other examples, the disclosure includes arrangements wherein the main transformer is configured to have a first excitation current when the contactors are closed, to have a second excitation current that is less than the first, in response to the high-Z transformer being coupled in the series circuit with the main transformer.

Other configurations of the impedance control transformer assembly also include the main transformer being configured to have a nominal excitation current when the bypass contactors are closed to bypass the high-Z transformer. In this example, a reduced excitation current is established for the main transformer, which is less by a factor of at least two, five, and/or ten, or more or less, and which is responsive to the high-Z transformer being coupled in the series circuit with the main transformer when the bypass contactors are opened. The disclosure also contemplates the main transformer being configured as one of a step up, step down, and or isolation transformer, and when the contactors are closed, to have a nominal input excitation current. As with other similar examples, a reduced excitation current is established for the main transformer that is less by a factor of between about two and about ten, or more or less, and which reduction is responsive to the high-Z transformer being coupled in the series circuit with the main transformer.

The above summary of the implementations and configurations of the elements, components, and constituents of the contemplated impedance control transformer assemblies and methods of operation introduces exemplary implementations, configurations, and arrangements, in simplified and less technically detailed arrangements. Such exemplars are explained in more detail below in the detailed description in connection with the accompanying illustrations and drawings, and the claims that follow.

The preceding summary is not intended to identify key features or essential features of the claimed technology, and it is not intended to be used as an aid in determining the scope of the claimed subject matter. The features, functions, capabilities, and advantages discussed here may be achieved independently in various example implementations or may be combined in yet other example arrangements, as further described elsewhere herein, and which may also be understood by those skilled and knowledgeable in the relevant fields of technology, with reference to the following description and drawings.

BRIEF DESCRIPTION OF THE DRAWINGS

A more complete understanding of example implementations of the present disclosure may be derived by referring to the detailed description and claims when considered with the following figures, wherein like reference numbers refer to similar or identical elements throughout the figures. The figures and annotations thereon are provided to facilitate understanding of the disclosure without limiting the breadth, scope, scale, or applicability of the disclosure. The drawings are not necessarily made to scale, but are instead arranged to pictorially, schematically, and functionally illustrate various exemplars and aspects of the disclosure.

DETAILED DESCRIPTION

Figure 1:
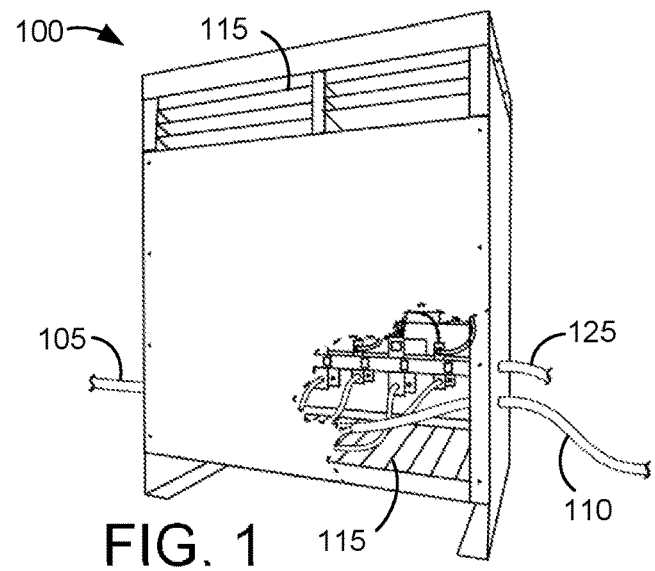
FIG. 1 is an illustration of an impedance control transformer assembly according to the principles of the disclosure.

Detailed embodiments of the present invention are disclosed herein; however, it is to be understood that the disclosed embodiments, adaptations, arrangements, variations, and modifications are example and or exemplary illustrations of the disclosure that may be embodied in various and alternative forms. As noted elsewhere, the figures are not necessarily to scale, and some features may be exaggerated or minimized to show details of particular components. Therefore, specific structural and functional details disclosed herein are not to be interpreted as limiting, but merely as a representative and exemplary basis for teaching one skilled in the art to variously employ the features, capabilities, and elements of the disclosure.

As those of ordinary skill in the art should understand, various features, components, and processes illustrated and described with reference to any one of the figures may be combined with those illustrated in one or more other figures to enable embodiments not otherwise explicitly illustrated or described. The combinations of features illustrated are representative embodiments for typical applications. Various combinations and modifications of the features consistent with the teachings of this disclosure, however, are achievable for particular applications or implementations, and should be readily within the ordinary knowledge, skill, and ability of those working in the relevant fields of technology.

The following detailed description is exemplary and for purposes of example but is not intended to limit the disclosure, the claims, or the demonstrative implementations and contemplated uses of the present disclosure. Descriptions of specific configurations, arrangements, devices, components, techniques, and applications for use and operation are provided only for purposes of enabling the skilled person with knowledge in the relevant fields of technology to comprehend the disclosure.

Modifications to the various configurations and variations of the disclosure as described herein should be readily apparent to those of ordinary skill in the art. The general aspects and principles described and illustrated herein may be applied to other configurations, variations, and arrangements without departing from the spirit and scope of the disclosure. Further, there is no intention to be bound by any expressed or implied theory presented or perceived, in the preceding descriptions of the field of technology, background, summary, or the figures and the following detailed descriptions. The disclosure should be accorded scope consistent with the claims as supported and contemplated by the accompanying figures and disclosure, and should not be limited only to the illustrative exemplars described and shown herein.

Example and representative arrangements, configurations, modifications, and implementations of the disclosure may be described herein in terms of specific components, devices, and exemplary equipment, and by way of physical, functional, and or logical systems, subsystems, components, elements, control systems that include computer and or hardware processor implemented systems. As further examples, such may also include or incorporate wired and wireless networks, and related architectures, processing instructions, and software, and various processing steps, sequences, and methods of operation.

It should be appreciated that such representative and schematic methods, figures, and diagrams may be understood by those skilled in the relevant fields of technology to be suitable for modifications, alternative configurations, and various other combinations, which may be practiced by any number of devices, components, equipment, hardware processors, computer hardware, computer and processor software, and or firmware components that are configured to enable, implement, and perform the specified capabilities and functions described and contemplated herein.

Conventional techniques and components related to use during operation, and other functional aspects of the systems of the disclosure (and the individual operating components of the systems), may be described herein only with enough technical detail so as to enable those with ordinary skill in the relevant fields of technology to practice the contemplated implementations of the disclosure.

As should be understandable to those with ordinary skill in the art, after comprehending the figures, disclosure, and claims, that the following are exemplary and illustrative implementations of the present disclosure, and are not limited to operating only in accordance with these examples. Other implementations may be realized and utilized, and changes in components, configurations, and exemplary sequences of operation may be made without departing from the contemplated scope of the example implementations presented herein.

Figure 2:
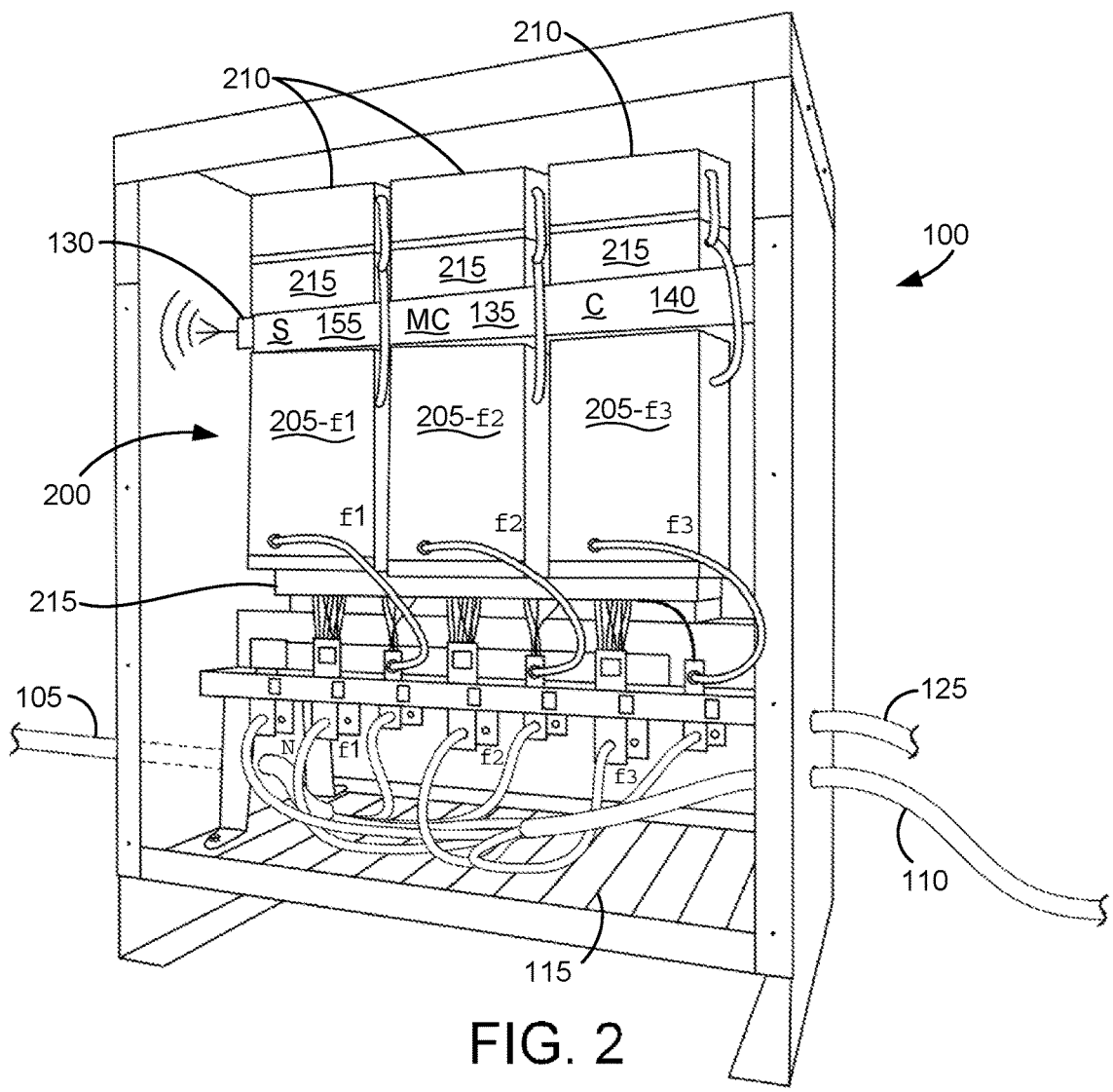
FIG. 2 depicts the transformer of FIG. 1 in enlarged scale and rotated, with a front panel removed to show additional aspects of the disclosure, and with components, features, and elements added, removed, and or rearranged for purposes of further illustration, and for depicting other exemplary aspects of the contemplated impedance control transformer assembly systems and methods.
Figure 3:
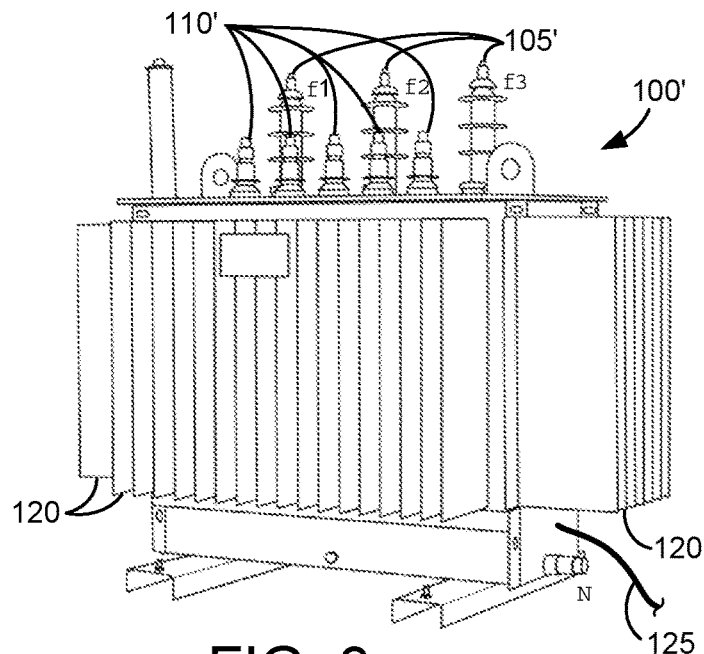
FIG. 3 shows further examples of aspects of the disclosure in modified scale, and according to the preceding figures and illustrates another contemplated arrangement of an impedance control transformer assembly modified for higher power applications than that of the preceding figures.

With reference now to the various figures and illustrations and specifically to FIGS. 1, 2, 3, 4, 5, and 6, and with specific reference initially to FIGS. 1, 2, and 3, exemplary impedance control transformer assemblies and systems 100, 100' are depicted. Transformers and assemblies and systems 100, 100' are configured with various control systems that may include feedback and feedforward networking, monitoring, and control capabilities, which are configured to automatically enable various aspects of the transformers and systems 100, 100'. Impedance control transformer assemblies and systems 100, 100' also are configured to be connected to and or coupled with an alternating current ("AC") electrical power source, station, substation, supply transformer, and or grid via connections 105, 105' and to supply isolated, converted (step-up, step-down, hybrids, and combinations thereof,), and or conditioned and controlled electrical power via a distributed load connections 110, 110'.

For purposes of example without limitation, FIGS. 1 and 2 depict examples of transformers and assemblies 100 to be what are referred to by some of those skilled in the art as dry insulated transformers and/or transformer assemblies, and which may be ventilated with vents 115 by ambient air flow created from internal heating and exterior movement of nearby atmospheric air. Such dry, insulated, ventilated transformers and assemblies and system 100 may have electrical power ratings over a wide range, including for example approximately 5 or 10 kilovolt-amps ("KVA") to nearly 100 KVA, or more or less. In FIG. 1, a portion of a front cover of transformer assembly 100 is cut-away as depicted with a dashed line, and for further illustration of interior components.

FIG. 3 is another exemplary illustration of transformers and assemblies and systems 100' that may be referred to by those having knowledge in the relevant fields of technology as liquid and or oil-cooled and insulated transformers, which may include actively or passively cooled radiating fins 120. Such transformer assemblies 100' may have higher electrical power ratings ranging between 75 KVA to 500 KVA and or more or less, and may also be configured as isolation, step-up, and or step-down transformers and systems 100', and hybrids and combinations thereof, which couple grid power via connections 105' with downstream distributed loads 110'.

Such transformers and systems and assemblies 100, 100' according to the disclosure may further include single and multiple phase configurations, and the disclosure illustrates single and triple phase arrangements while contemplating other variations without limitation. In the exemplary three-phase configurations disclosed herein (see, e.g., FIGS. 2, 3, and 4) a neutral line is designated "N", a first phase is designated f1 (Greek letter "phi"), and second and third phases are designated as f2 and f3 respectively. The distributed loads and or connections 110, 110' may supply the isolated, converted, and or conditioned and controlled electrical power to various other components, devices, downstream transformers, building power distribution systems, and the like.

The transformers, assemblies, and systems 100, 100' also may incorporate and or be in communication with control systems and or hardware processors and electrical grid systems, power stations and or substations, and other related components via wired and or wireless communications networks such as a wired network 125 and or a wireless network via a wireless access point 130 ("WAP"). With continued reference to FIGS. 1, 2, and 3, and also now briefly to FIGS. 4 and 5, in various adaptations, such transformers and system 100, 100' may also further incorporate master control ("MC") electronics 135 and other controllers ("C") 140 that may further include such hardware processors and control system software, among other components and capabilities.

In an exemplary arrangement and configuration, assemblies, transformers, and systems 100, 100' include hardware-processor and or computer-based master control systems MC 135, which may incorporate exemplary primary and or master hardware-based controllers, hardware processors, and or control systems MCs 135, which are coupled to various subsystems or other processors, controllers, and or control systems Cs 140. These components and systems may incorporate and or be coupled by and with wired or wireless network or networks and or access points WAP 125, 130, and contemplated similarly capable communications hardware and components.

As depicted in the various figures and labeled in some portions with reference numerals 125, 130, such communications systems and networks 125, 130 are schematically illustrated in the figures to have dashed lines. The dashed lines graphically represent various exemplary types of hardware and or wireless connections between and among the various components, elements, devices, and subsystems of the transformer assemblies and systems 100, 100' and the contemplated communications components and systems of network or networks 125 and or WAPs 130.

Such master and subsystem processors, controllers, and or control systems MCs, Cs, 135, 140 may incorporate and further be and or include one or more hardware and or software processors, controllers, and or hardware servers, and which may further include for additional examples, other hardware micro-processor-based controllers as described elsewhere herein. Networks 125 and WAPs 130 may also include hardware embodied network controllers and routers, in addition to communications links between such controllers, and sensors, solenoids, servos or servomotors or servo-actuators of the transformer assemblies 100, 100', and related systems and components.

Also contemplated but not shown in the figures are off-site or cloud-based systems and components external to assemblies 100, 100'. Such networks 125 and WAPs 130 may also include, incorporate, and or be coupled to and in communication with internal, external, wired, and wireless personal area networks (PANs), local area networks (LANs), wide area networks (WANs), and peer to peer networks (P2P), among others, and as contemplated elsewhere herein.

In further examples without limitation, processors, controllers, and or control systems 135, 140, and or other hardware controllers, devices, and processors, may include, be coupled to, be configured with, and or cooperate with one or more integrally included, embedded, remote cloud-based, and or other types of independently arranged systems, controllers, and or sensors. These components may cooperate in parallel, in series, and distributively with one another, and with other controllers, subsystems, and internal and external systems to manage and control transformers and systems 100, 100' as well as external devices, and such other controllers, and or actuators.

Such components are responsive to various contemplated control signals ("CSs") 145, and sensor and communication signals, data, parameters, and other signals and information (collectively also referred as data signals or "DSs") 150. Such CSs 145 and DSs 150 are identified, established by, communicated to, and received from the contemplated systems, controllers, and components, as well as other cooperative systems that are external and or remote to transformers and systems 100, 100'.

Networks 125 and WAPs 130 may include preconfigured, dynamic, static, ad hoc, and similar types of hardware networks and communications, utilizing various industry protocols, standards, and or messaging formats that available in various information technology, commercial, industrial, and or residential environments in the United States and other countries. Such protocols, standards, and or network communications formats are utilized for purposes of enabling various aspects of the disclosure and are known to those having knowledge in the relevant technology.

For purposes of further example without limitation, such networks 125 and WAPs 130 may incorporate various aspects of such network and communications standards and architectures known to those with skill in the art. Such may include, among many others, those described and managed by the IEEE 802 local area network and metropolitan area network (LAN/MAN) and related standards committees, which can be found for example via the internet at www.ieee802.org, as well as standards.ieee.org, and similar standards and organizations.

In another example, IEEE Standards 802.11 support software and firmware communications services that enable data link media access control (MAC) and physical layer (PHY) capabilities, such as wireless local area network (WLAN) data communications in various frequency bands. For further example, the exemplary 802.11 standard is entitled "IEEE Standard for Information technology—Telecommunications and information exchange between systems—Local and metropolitan area networks—Specific requirements Part 11: Wireless LAN Medium Access Control (MAC) and Physical Layer (PHY) Specifications," and is available at ieeexplore.ieee.org/document/7792308.

While illustrated by this disclosure for purposes of example, as discrete, individual master and subsystem hardware-based processors, controllers, and or control systems 135, 140, many alternative configurations are contemplated for use as such controllers, processors, control systems, subsystems, and systems. These contemplated elements may control, be controlled by, communicate signals to and from, and exchange data with other processors, controllers, and other sensors, actuators, signals, and components, which are part of or remote to assemblies and system 100. These may include for example without limitation, external control systems, and internal and external networks, components, subsystems, and systems. The capabilities and configurations described in connection with any specific hardware micro-processor-based or other controller or hardware processor as contemplated herein may be incorporated in one or more other controllers, and or may be distributed across more than one such exemplary controller.

These arrangements also contemplate that multiple controllers 135, 140 can individually, collaboratively, in combination, and cooperatively enable any such capability and configuration. Accordingly, recitation herein of "control system," "processor," "a controller" or "the controller(s)" is intended to refer to such hardware, software, virtual, and hybrid controllers, processors, components, subsystems, systems, and or discrete and embedded elements, both in the singular and plural connotations, and individually, collectively, and in various suitable embedded, cooperative, and distributed combinations.

Further, communications over, though, about, and within and with transformers, assemblies, and systems 100, 100', over networks 125 and WAPs 130 and other internal and external PANs, LANs, and or WANs, also contemplate responding to, sharing, transmitting, communicating, and receiving of command and control signals CSs 145, and sensor and data signals DSs 150, and also include embedding data in such signals, control logic, and information. This is accomplished between controllers, and sensors, actuators, controls, MCs 135, Cs 140 and related systems and components of transformers and systems 100, 100' and related or cooperating external systems.

In additional examples, such processors, controllers, and or control systems 135, 140, communicate with one or more controller-based input/output (I/O) interfaces and or the networks 125 and WAPs 130, and may include integrated interfaces enabling communication of raw data and signals, CSs 145, DSs 150 and or signal conditioning, processing, and or conversion, short-circuit protection, circuit isolation, and similar capabilities. Alternatively, one or more dedicated hardware or firmware or software or virtual devices, application specific integrated controllers (ASICs), and other types of controllers, processors, and systems on a chip (SoCs) may be implemented herein and may be also used to precondition and preprocess particular signals and data during communications, and before and after such signals and data are communicated.

The contemplated processors, controllers, and or control systems 135, 140, in further illustrations, and other controllers, may include, incorporate, implement, be coupled to, and or communicate with one or more hardware or software or virtual microprocessors or central processing units (CPU) that control or implement various types of computer readable hardware storage devices or media. Such computer readable storage devices or media may include volatile and nonvolatile storage in rewriteable, erasable, programmable, and read-only memory (ROM, PROM, rROM, eROM, ePROM, etc.), random-access memory (RAM), and rewritable, erasable, and non-volatile or keep-alive memory (NVRAM or KAM, eNVRAM, eKAM, NVM, NVMe, etc.).

Such NVRAM or KAM is a persistent or non-volatile memory that may be used to store various commands, executable control logic and instructions and code, data, constants, parameters, and variables needed for operating the transformers and systems 100, 100', while such may be initialized, rebooted and or are unpowered or powered off. Computer-readable storage devices or media may be coupled to such processors, controllers, networks, systems, and devices and implemented using any of a number of known persistent and non-persistent memory devices. Such exemplary devices include for example, PROMs (programmable read-only memory), EPROMs (rewritable and or erasable PROM), EEPROMs (electrically erasable PROM), hard disk drives (HDDs), solid state drives (SSDs), flash memory, or any other electric, magnetic, optical, and or hybrid and combination memory devices capable of receiving, transmitting, storing, and communicating data.

Each of such devices, components, processors, microprocessors, controllers, microcontrollers, memories, storage devices, and or electronic media of transformers and systems 100, 100' may also further contain, include, and or be embedded with one or more basic input and output systems (BIOSs), operating systems, application programming interfaces (APIs). These included elements have, enable, and or implement remote procedure call (RPCs), and related firmware, microcode, software, logic instructions, commands, and the like, which enable programming, customization, coding, and configuration, and which may be embedded and or contained in at least one of and or distributed across one or more such devices, among other capabilities.

The various arrangements of transformers and systems 100, 100' in FIGS. 2, 4, 5, and 6 also depict the various hardware controllers, processors, ASICs, SoCs, and control systems 135, 140 communicating signals and data CSs 145, DSs 150 with exemplary sensors, solenoids (labeled with reference letter "S" or numeral 155), equipment, and actuators in communication with the wired and or wireless networks 125 and WAPs 130. Such signals and data CSs 145, DS 150, include signals and information that control, monitor, and report operations of transformers and systems 100, 100', and may also include various other signals and data that may be similarly communicated throughout transformers and systems 100, 100'.

In further exemplary variations, the contemplated signals and data CSs 145, DSs 150, may for example typically include commands, logic, and instructions and code, data, information, analog and digital signals, settings, and parameters, including preferred operating parameters, predetermined values, settings, and preferences of assemblies, transformers, and systems 100, 100'. Such CSs 145, DSs 150 may also be input, received, retrieved from, captured, and stored in a repository, storage device, memory, and other types of data storage of the system, and may be communicated therewith between, to, and from the contemplated equipment, components, sensors, actuators, and devices of transformer assemblies 100, 100'.

Any and or all of these signals CSs 145, DSs 150 can be raw analog or digital signals and data, as well as preconditioned, preprocessed, combination, and or derivative data and signals generated in response to other signals and system operations. Such signals and data CSs 145, DSs 150 may encode, embed, represent, and be represented by voltages, currents, capacitances, inductances, impedances, and digital data representations thereof, as well as digital information that encodes, embeds, and or otherwise represents such signals, data, and analog, digital, and multimedia information.

Figure 4:
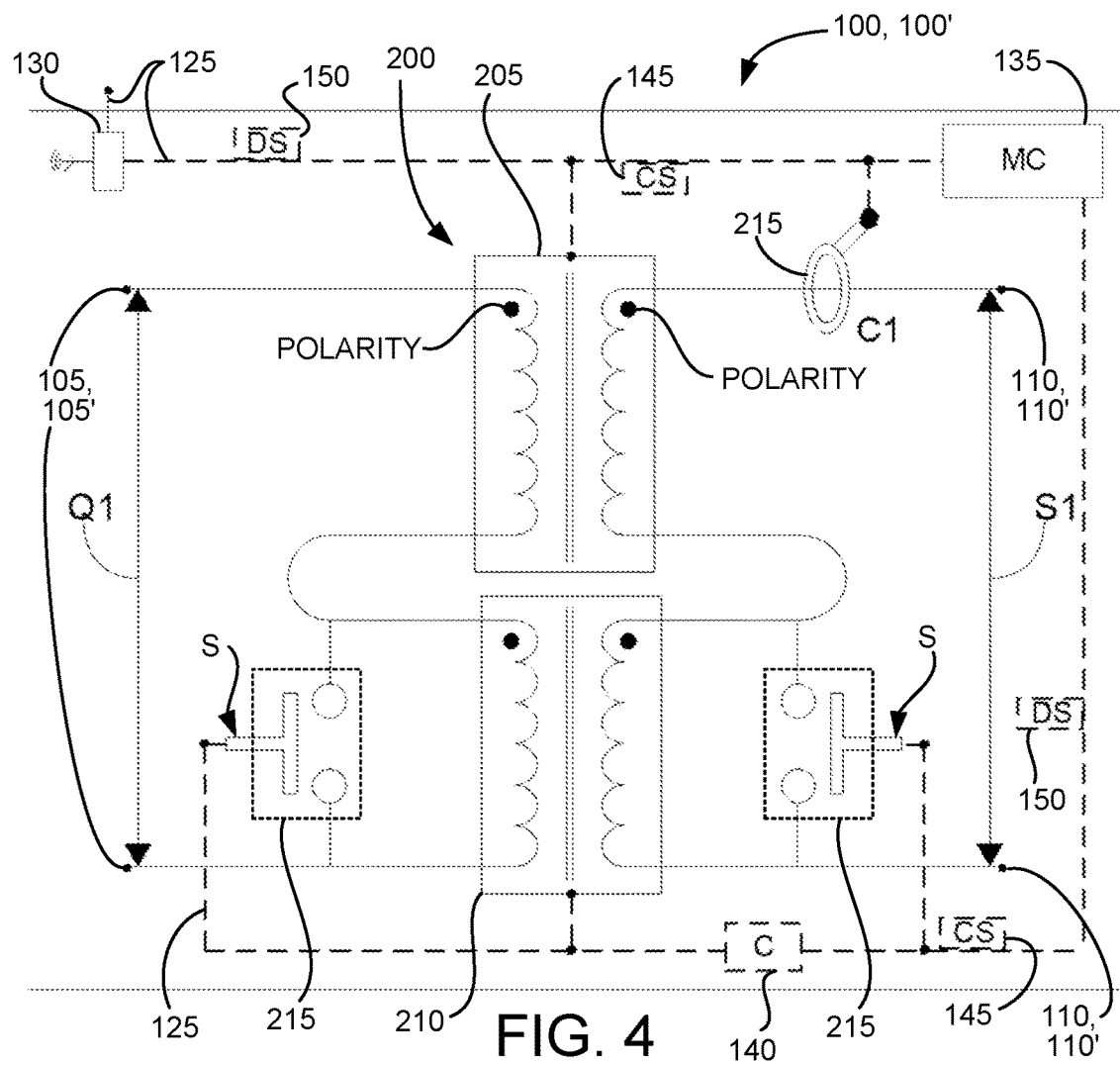
FIG. 4 is schematic representation of an exemplary electrical configuration of impedance control transformer assemblies of the preceding figures and according to the disclosure, with various structure and components removed, added, and modified to enable additional illustrative aspects of the disclosure to be shown.
Figure 5:
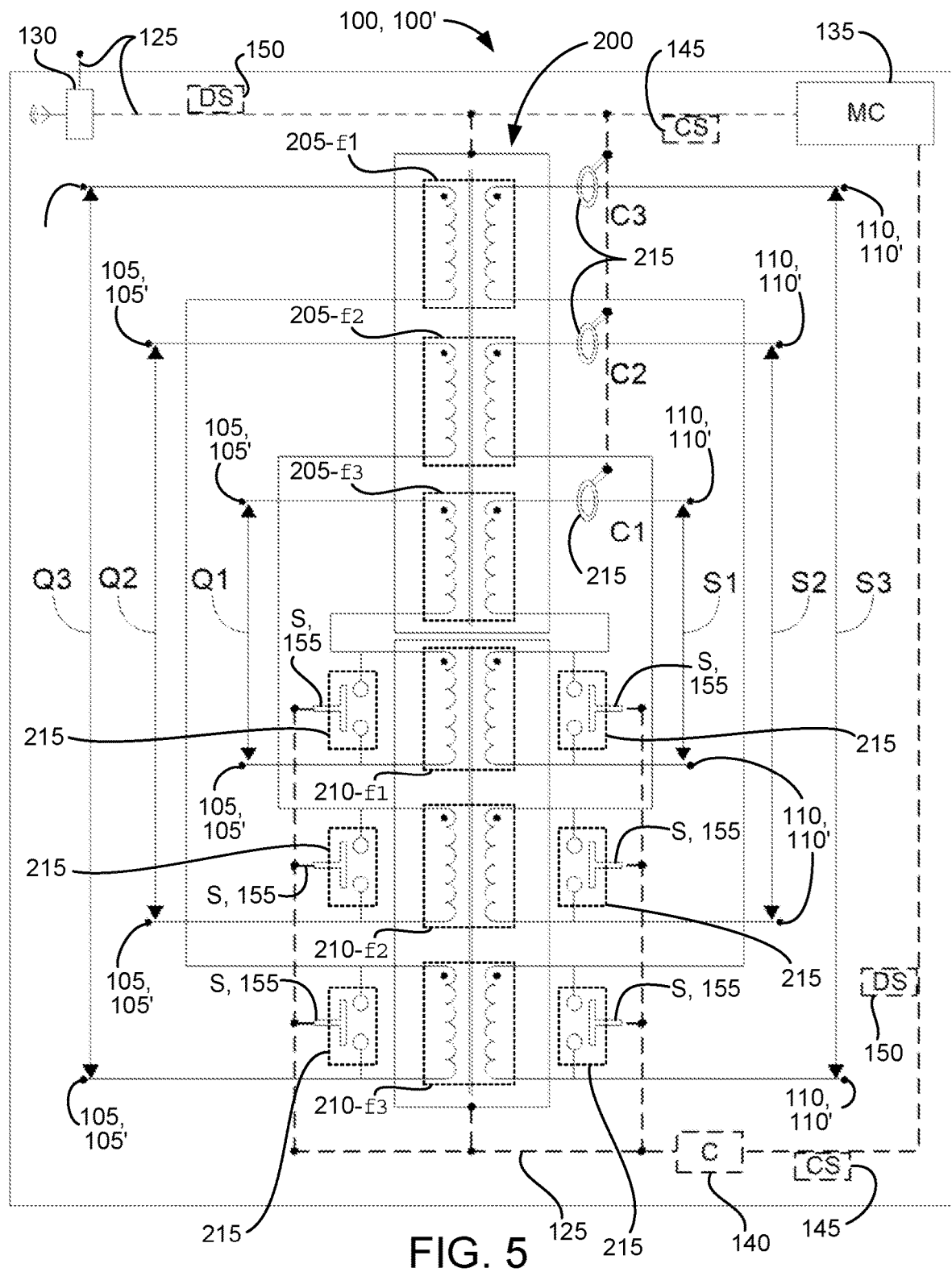
FIG. 5 is also a schematic representation but of another exemplary electrical configuration of the impedance control transformer assemblies of the prior figures, and which includes certain features removed, and other added features and components that further illustrate other contemplated aspects of the disclosure.
Figure 6:
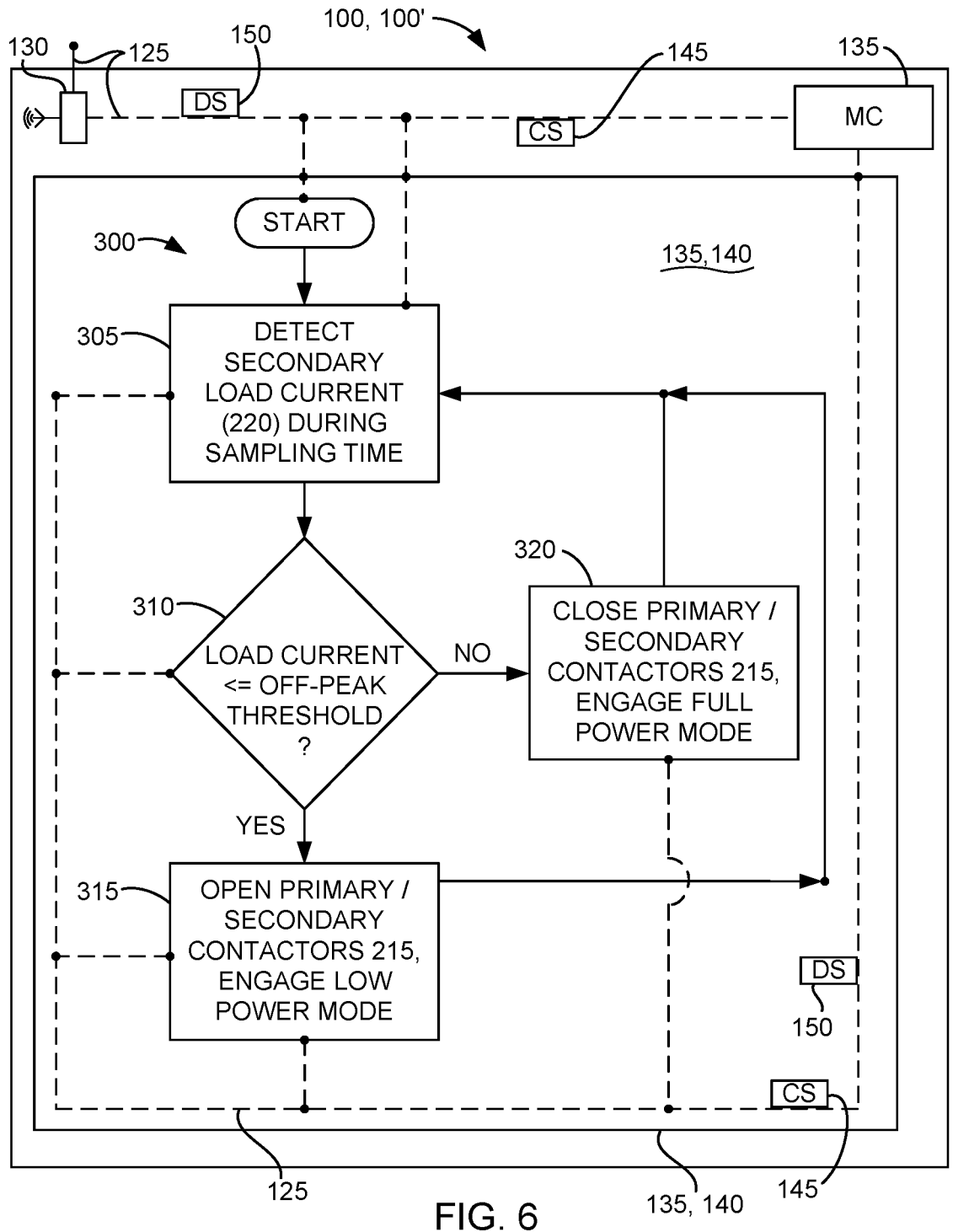
FIG. 6 is a representative and exemplary logic diagram that illustrates certain aspects of operation of the impedance control transformer assemblies contemplated by the preceding figures and the disclosure.

The communication and operation of the described signals, commands, control instructions and logic, parameters, values, and data and information, CSs 145, DSs 150, may be represented schematically as shown in FIGS. 4, 5, and 6, and other figures, and by schematically represented data communication lines and signals and wireless signals and data connections. Such signals, data, commands, CSs 145, DSs 150 and other items are generated and consumed by the various contemplated controllers, sensors, actuators, and other system components. The figures, diagrams, and written description of the disclosure illustrate exemplary commands and control processes, control logic and instructions, and operation strategies, which may be implemented using one or more computing, communication, and processing techniques that can include real-time, event-driven, interrupt-driven, multi-tasking, multi-threading, virtualization, containerization, and combinations thereof.

As FIG. 6 depicts for further exemplars, the steps and functions shown may be executed, communicated, and performed in the sequence depicted, and in parallel, in repetition, in modified and different sequences, and in some cases may be combined with other processes and or omitted. The commands, control logic, parameters, values, and instructions CSs 145, DSs 150 may be executed in one or more of the described processors, microprocessor-based controllers, MCs 135, Cs 140, in external controllers and systems, and may be embodied as primarily hardware, software, firmware, and virtualized and or containerized hardware/software/firmware, and combinations thereof.

With continuing reference to FIGS. 2, 4, 5, and 6, transformers, transformer assemblies, and systems 100, 100' also incorporate various components such as solenoids S, 155 that are configured to actuate various other components as described elsewhere herein, such as switches, contactors, and other devices and components of transformers and systems and assemblies 100, 100'. For example, such solenoid actuatable components are networked, in communication with, and or electronically coupled, by one or more of network 125 and WAPs 130, to one or more master and subsystem control systems/controllers/hardware processors MCs 135, Cs 140, and are operable and monitored by signals CSs 145, DSs 150, among other means. Such components also communicate the various control/data signals CSs 145, DSs 150, which may be automatically sensed, detected, generated, communicated, and monitored, as real-time measurements and as process control data, about the network 125 and WAPs 130.

In these arrangements, processors, controllers, and or control systems 135, 140, and networks and WAPs 125, 130 cooperatively manage and control transformer assemblies 100, 100' and constituent components and other controllers, sensors, and actuators. Such may further include for continuing example without limitation, the noted solenoids S, 155 and contactors, and or servos or servomotors or servoactuators for actuating other contemplated components, such as switches and contactors. Specifically, such solenoid and servo actuated components S, 155 are contemplated for use throughout transformers, assemblies, and systems 100, 100', and are depicted in the various figures as symbols described elsewhere herein, and which may also be labeled with reference label "S" in certain figures.

In further variations of the disclosure, the processors, controllers, and or control systems 135, 140, and networks and WAPs 125, 130, also receive data and signals CSs 145, DSs 150 from, communicate with, and establish bidirectional communications with internal and external signal and data sources of and for transformers and assemblies and systems 100, 100'. These variations communicate real-time, automatically sensed measurements from various sensors and components, as well as control commands, logic, and instructions and code, data, information, and signals to and or from various devices, equipment, contactors, and or sensors. Various exemplary types of sensors are contemplated for implementation, incorporation, and utilization with transformer assemblies 100, 100', and may be understood by those skilled in the relevant fields of technology of such transformers and systems 100, 100'.

With continuing specific reference to FIGS. 2, 4, 5, and 6, as well as the other figures, the new and improved assemblies, transformers, and systems 100, 100' also include one or more impedance control transformer assemblies 200, which further incorporate at least one main transformer 205 for each phase that may be required for an exemplary application. With reference to FIGS. 2 and 5, main transformers 205-f1, 205-f2, and 205-f3 are depicted in a three-phase arrangement, while FIG. 4 schematically illustrates a single-phase arrangement having only a single main transformer 205. Each of such main transformers 205, 205-f1, 205-f2, and 205-f3 are configured with a predetermined alternating current frequency rating, nominal impedances, and power ratings and or ranges thereof, according to the intended application. When operating, main transformers 205, 205-f1, 205-f2, and 205-f3 have a nominal excitation current, which at certain operating voltages and frequencies establishes a nominal power consumption of the respective primary windings.

With specific reference to FIGS. 4 and 5, it may be understood that main, step-down, step-up, isolation, and similar transformers 205, 205-f1, 205-f2, and 205-f3 are also configured with primary and secondary windings that are coupled by primary winding inputs labeled schematically Q1, Q2, Q3, to corresponding phases of electrical grids or sources 105, 105'. Respective secondary windings of main transformers 205, 205-*f*1, 205-*f*2, and 205-*f*3 are also configured to be coupled to downstream, distributed loads 110, 110' by secondary winding outputs labeled S1, S2, and S3.

As utilized by some having skill in the art, FIGS. 4 and 5 also incorporate solid circular dots adjacent to transformer winding schematics 205, 205-*f*1, 205-*f*2, and 205-*f*3 with notations sometimes used to designate exemplary polarity circuit connections to the depicted primary, input winding connections Q1, Q2, Q3, and secondary winding output connections S1, S2, S3.

The one or more impedance control transformer assemblies 200 of transformers and systems 100, 100' further incorporate one or more isolation, high-impedance or high-Z transformers 210, 210-*f*1, 210-*f*2, and 210-*f*3, which are selected to have respective impedances that exceed the nominal impedances of the main transformers, and according to the intended application. In other configurations, the contemplated high-Z transformers 210, 210-*f*1, 210-*f*2, and 210-*f*3 may have similar, lower, and/or higher impedances, such that when coupled to and combined in series with the main transformers 205, 205-*f*1, 205-*f*2, and 205-*f*3, an increased impedance is established that exceeds the nominal impedances.

The disclosure also references these contemplated high-impedance transformers 210, 210-*f*1, 210-*f*2, and 210-*f*3, elsewhere herein as "high-Z" transformers. Here, the term "high-Z" refers to a convention adopted by some in the field of technology that refers to impedance magnitudes by the letter variable "Z". The disclosure herein also contemplates that the high-Z transformer is typically configured to have an impedance that, when combined with the main, isolation, and/or step down transformer, increases the impedance of the assembly, such that power is conserved and consumption is reduced.

As may be understood with continuing reference to FIGS. 2, 4, 5 as well as the other figures and accompanying disclosure, transformers and systems 100, 100' include impedance control transformer assemblies 200 further incorporating actuatable switching assemblies and or bypass contactors 215. At least one such contactor 215 is utilized for each respective phase of each respective winding, and they are each actuated by solenoids, servo-motors, and or other similarly capable actuation devices S, 155. These contemplated switching assemblies and or bypass contactors 215 are configured to be coupled between main transformers 205, 205-*f*1, 205-*f*2, 205-*f*3 and high-Z transformers 210, 210-*f*1, 210-*f*2, and 210-*f*3.

As thereby configured, when bypass contactors 215 are closed, main transformers 205, 205-*f*1, 205-*f*2, 205-*f*3 operate in a stand-alone arrangement with a nominal impedance, and are electrically isolated from high-Z transformers 210, 210-*f*1, 210-*f*2, 210-*f*3, in a bypass configuration. Here, the closed bypass contactors 215 establish a short circuit across each phase of the transformer assemblies 200, such that a nominal impedance of the stand-alone arrangement is established, which in turn enables a full power mode of operation of the transformers and systems 100, 100'. In this full power mode of operation, the main transformers 205, 205-*f*1, 205-*f*2, 205-*f*3 are characterized to have a nominal excitation current that establishes a nominal power consumption therefor.

Alternatively, when bypass contactors 215 are open, main transformers 205, 205-*f*1, 205-*f*2, 205-*f*3 are coupled in series with high-Z transformers 210, 210-*f*1, 210-*f*2, 210-*f*3, which in turn increases the aggregate and or combined impedance of each phase of the input, primary windings Q1, Q2, Q3, and the secondary, output windings S1, S2, S3. In this configuration, transformers and systems 100, 100' are enabled to operate in a low power mode as a result of the aggregate and or combined impedance increase across each phase. Here, the nominal excitation current of the main transformers 205, 205-*f*1, 205-*f*2, 205-*f*3 is reduced in response to the increased impedance, which in turn reduces the power consumed by the primary windings thereof.

The systems, assemblies, and transformers 100, 100' of the disclosure also contemplate incorporation of one or more current sensors 220 that are configured to detect power demand of at least one distribution load 110, 110'. The current sensor(s) 220 are also labeled in FIGS. 2, 4, and 5 with references C1, C2, C3, are typically each coupled with and or about the respective secondary, output windings S1, S2, S3, to detect, sense, and or measure demand for electrical power by distributed loads 110, 110' during operation.

Reference also to FIG. 6, with continuing reference to the other figures, further illustrates exemplary operations of assemblies and transformers and systems 100, 100'. For purposes of example but not for limitation, during operation, one or more processors of master controllers MCs 135 and or other controllers Cs 140 are configured at step 300 to begin operation. At step 305, MCs 135 and or Cs 140 monitor, detect, and or receive sensor and data signals DSs 150, from at least one of coupled current sensors 220 and or bypass contactors 215.

When electrical power demand from loads 110, 110' decreases, MCs 135 and or Cs 140 automatically, in real-time, detect sensor and data signals DSs 150 from current sensors 220 that establish at step 310 that such power demand is less than, equal to, and or less than or equal to a predetermined threshold. Various such predetermined thresholds may be implemented according to various intended environments and applications, and may be varied over time according to changing conditions. The predetermined thresholds may include for example without limitation, a predetermined "off-peak" threshold that may be 1%, 5%, and or 10% of nominal full power, peak use values of electrical power demand.

While these are merely illustrative examples, the disclosure contemplates such thresholds as being any other suitable predetermined threshold, which can vary over time spans, days of the week, and or according to any design criteria of import to various power grid, power distribution, power station, industrial, commercial, and or residential neighborhood substation requirements. Such contemplated thresholds may also be calibrated and calculated in real-time according to actual operations, and may be remotely updated and varied by electrical power suppliers and authorities, as well as by consumers that may own and control various of such contemplated power systems.

In response, MCs 135 and or Cs 140 are configured at step 315 to generate control signals CS 145 that are communicated about network(s) 125, 130 to solenoids S, 155, to actuate bypass contactors 215 to an open position. This enables the transformers, assemblies, and systems 100, 100' to operate in the noted low power mode, as the impedance of the primary and secondary windings of transformer assemblies 200 is increased by establishing main transformers 205, 205-*f*1, 205-*f*2, 205-*f*3 and high-Z transformers 210, 210-*f*1, 210-*f*2, 210-*f*3 to be coupled in a series circuit.

As electrical power demand of loads 110, 110' changes and or increases at other times, in real-time and automatically, MCs 135 and or Cs 140 detect at step 305, sensor and data signals DSs 150 from current sensors 220, which establish at step 310 a changed and or increased power demand to be greater than the predetermined off-peak threshold. In this circumstance, MCs 135 and or Cs 140 are configured at step 320 to generate control signals CS 145, which are transmitted via network(s) 125, 130 to solenoids S, 155, and which in turn actuate bypass contactors 215 to closed position. When so closed, bypass contactors 215 isolate and bypass high-Z transformers 210, 210-*f*1, 210-*f*2, 210-*f*3, lowering overall impedance and enabling full power mode with main transformers 205, 205-*f*1, 205-*f*2, 205-*f*3 operating in nominal impedance, full power mode.

In various tested implementations and configurations, it was discovered that the assemblies, transformers, and systems 100, 100' according to the disclosure decreased the power consumed by the main transformers 205, 205-*f*1, 205-*f*2, 205-*f*3 by at least between about two to five and 10 to 20 times, and more and less, compared to nominal full power operation, due to the substantially reduced excitation current resulting from the increased impedance. Various physical and operating mode configurations of transformers and systems 100, 100' were tested. In one example, transformer assemblies 100, 100' were configured with a power rating of 50 Kilovolt-Amps ("KVA"), and in another example a 14 KVA rated arrangement was utilized. In both examples, considerable power savings were achieved during operation in low power mode, such that detailed assessments of power and cost savings were calculated to demonstrate that substantially reduced real-time and life-cycle costs of operation can be achieved according to the principles of the disclosure.

In the exemplary arrangements, various parameters were established to enable testing. For example, a three-phase, 208 volt electrical source 105, 105' (+/−10%) configuration with a power factor of 0.9, and a delta-input-primary winding to Wye-output-secondary winding, and isolation transformer (same input and output voltages) configuration was selected for assemblies and transformers and systems 100, 100'. An industrial/commercial environment was simulated wherein it was assumed that off-peak use would occur about 12 hours per day.

An average cost of source electrical power was selected to be $0.15 per kilowatt-hour. In the first test configuration, the range of input and output voltages was measured in both nominal, full power and low power modes of operation. The following Table 1 illustrates the average observed parameters for an exemplary 50 KVA system while Table 2 illustrates operation of a comparable 14 KVA system. The exemplary transformers and systems and assemblies 100, 100' were cycled during the operations contemplated herein above, and to have a nominal full power and simulated, automated low power mode of operation over various cycles of time, and power consumption and costs were calculated assuming 12 average hours of full power operation, and 12 average hours of low power operation.

TABLE 1

| 50 KVA Transformers and System 100, 100' | | | |
|---|---|---|---|
| | 50 KVA | 50 KVA +10% | |
| 50 KVA Transformers and System 100, 100' - AUTO FULL/LOW POWER MODE | | | |
| Average 3 Phase Input Volts, V = | 208.0 | 228.8 | volts |
| Average FULL POWER Current, I = | 3.40 | 4.90 | amps |
| Calculated KVA = | 2121.6 | 3363.4 | KVA |
| Power Consumed = | 1.909 | 3.027 | kW per hour |
| FULL POWER Idle Cost = | $0.29 | $0.45 | $/Hour |
| 12 hrs. FULL POWER COST/Day = | $3.44 | $5.45 | |
| ×30 days/month = | $103.11 | $163.46 | Full Power Monthly Cost |
| ×365 days/year = | $1,254.50 | $1,988.75 | Full Power Cost |
| ×20 year lifespan = | $25,090.04 | $39,775.10 | Full Power Lifecycle Cost |
| 50 KVA Transformer 100, 100' - LOW POWER MODE | | | |
| Average LOW POWER Current = | 0.027 | 0.035 | amps |
| Calculated KVA = | 16.848 | 24.024 | KVA |
| Power Consumed = | 0.01516 | 0.02162 | kW per hour |
| LOW POWER Cost = | $0.0023 | $0.0032 | $/Hour |
| 12 hours LOW POWER/Day = | $0.03 | $0.04 | |
| ×30 days/month = | $0.82 | $1.17 | Auto Low Power Monthly Cost |
| ×365 days/year = | $9.96 | $14.21 | Auto Low Power Annual Cost |
| ×20 year lifespan = | $199.24 | $284.11 | Auto Low Power Lifecycle Cost |
| COST SAVINGS - AUTO LOW POWER MODE ON DEMAND, ASSUME 12 HOURS/DAY | | | |
| COST SAVINGS/Day = | $3.41 | $5.41 | Daily Savings |
| COST SAVINGS/month = | $102.29 | $162.29 | Monthly Savings |
| COST SAVINGS/year = | $1,244.54 | $1,974.55 | Annual Savings |
| COST SAVINGS over lifespan = | $24,890.80 | $39,490.99 | Lifecycle Savings |
| COST SAVINGS = | 99.206% | 99.286% | Aggregate % Savings |

Those having ordinary skill in the relevant fields of technology may be able to comprehend from Table 1, that the transformer assemblies 100, 100' according to the disclosure, when operated in an automated full power, low power mode of operation, wherein low power mode may be possible for about 12 hours per day, can achieve a power savings of exceeding about 99.2% over comparable prior art systems.

TABLE 2

| 14 KVA Transformers and System 100, 100' | | | |
|---|---|---|---|
| | 14 KVA | 14 KVA +10% | |
| 14 KVA Transformer 100, 100' - AUTO FULL/LOW POWER MODE | | | |
| Average 3 Phase Input Volts, V = | 208.0 | 228.8 | volts |
| Average FULL POWER Current, I = | 2.47 | 4.04 | amps |
| Calculated KVA = | 1541.3 | 2773.1 | KVA |
| Power Consumed = | 1.387 | 2.496 | kW per hour |
| FULL POWER Idle Cost = | $0.21 | $0.37 | $/Hour |
| 12 hrs. FULL POWER COST/Day = | $2.50 | $4.49 | |
| x30 days/month = | $74.91 | $134.77 | Full Power Monthly Cost |
| x365 days/year = | $911.36 | $1,639.71 | Full Power Cost |
| x20 year lifespan = | $18,227.18 | $32,794.16 | Full Power Lifecycle Cost |
| 14 KVA Transformer 100, 100' - LOW POWER MODE | | | |
| Average LOW POWER Current = | 0.029 | 0.044 | amps |
| Calculated KVA = | 18.096 | 30.2016 | KVA |
| Power Consumed = | 0.01629 | 0.02718 | KW per hour |
| LOW POWER Cost = | $0.0024 | $0.0041 | $/Hour |
| 12 hours LOW POWER/Day = | $0.03 | $0.05 | |
| x30 days/month = | $0.88 | $1.47 | Auto Low Power Monthly Cost |
| x365 days/year = | $10.70 | $17.86 | Auto Low Power Annual Cost |
| x20 year lifespan = | $214.00 | $357.16 | Auto Low Power Lifecycle Cost |
| COST SAVINGS - AUTO LOW POWER MODE ON DEMAND, ASSUME 12 HOURS/DAY | | | |
| COST SAVINGS/Day = | $2.47 | $4.44 | Daily Savings |
| COST SAVINGS/month = | $74.03 | $133.30 | Monthly Savings |
| COST SAVINGS/year = | $900.66 | $1,621.85 | Annual Savings |
| COST SAVINGS over lifespan = | $18,013.17 | $32,437.00 | Lifecycle Savings |
| COST SAVINGS = | 98.826% | 98.911% | Aggregate % Savings |

Table 2 depicts another example wherein transformers and systems 100, 100' according to the disclosure, when operated in an automated full power, low power mode of operation, such that low power mode may be effectively in use for about 12 hours per day, so that a power savings of exceeding about 98.8% is possible over comparable prior art systems.

While exemplary embodiments are described above, it is not intended that these embodiments describe all possible forms of the disclosure and transformers and system 100, 100'. Rather, the words used in the specification are words of description and illustrative example, rather than limitation, and it to be understood that various changes may be made without departing from the spirit and scope of the invention. Additionally, the features of various implementations may be combined to form further configuration of the invention that are within the scope of the following claims.

What is claimed is:

1. An impedance control transformer assembly, comprising:
    a high-Z transformer configured to be coupled to a main transformer that has an impedance and that is coupled to an electrical source and at least one distribution load;
    bypass contactors coupled between the main transformer and the high-Z transformer, and configured when closed to bypass the high-Z transformer and when open to couple the main transformer and the high-Z transformer in series increasing the impedance;
    a current sensor configured to detect power demand of the at least one distribution load; and
    one or more processors coupled to the current sensor and the bypass contactors, and configured to actuate the bypass contactors, responsive to detected power demand.

2. The impedance control transformer assembly according to claim 1, further comprising:
    the one or more processors configured to open the bypass contactors when the detected power demand is less than a predetermined threshold, to increase impedance and establish a low power mode for the assembly.

3. The impedance control transformer assembly according to claim 1, further comprising:
    the one or more processors configured to close the bypass contactors to bypass the high-Z transformer when the detected power demand equals or exceeds a predetermined threshold, to decrease impedance and establish a full power mode for the assembly.

4. The impedance control transformer assembly according to claim 1, further comprising:
    the main and high-Z transformers are configured as single-phase transformers configured to have respective input primary windings configured to be coupled to the electrical source, and respective output secondary windings configured to be coupled to the at least one distribution load; and
    the bypass contactors include primary and secondary contactors.

5. The impedance control transformer assembly according to claim 1, further comprising:
    the main and high-Z transformers are configured as three-phase transformers configured to have respective input primary windings for each phase configured to be coupled to the electrical source and respective output secondary windings for each phase with at least one phase configured to be coupled to the at least one distribution load; and
    the bypass contactors include respective primary contactors for each phase of the primary windings and respective secondary contactors for each phase of the secondary windings.

6. The impedance control transformer assembly according to claim 1, further comprising:
the high-Z transformer, when coupled in series to establish a low power mode, decreases the power consumed from the electrical source by the main transformer relative to operation in a full power mode.

7. The impedance control transformer assembly according to claim 1, further comprising:
the main transformer is configured to have a nominal excitation current; and
wherein a reduced excitation current less than the nominal is established responsive to the high-Z transformer being coupled in series with the main transformer.

8. The impedance control transformer assembly according to claim 1, further comprising:
the main transformer is configured to have a first excitation current when the bypass contactors are closed; and
wherein a second excitation current less than the first is established for the main transformer, responsive to the high-Z transformer being coupled in series with the main transformer.

9. The impedance control transformer assembly according to claim 1, further comprising:
the main transformer is configured to have a nominal excitation current when the bypass contactors are closed to bypass the high-Z transformer; and
wherein a reduced excitation current is established for the main transformer that is less by a factor of at least ten, and responsive to the high-Z transformer being coupled in series with the main transformer when the bypass contactors are opened.

10. The impedance control transformer assembly according to claim 1, further comprising:
the main transformer is configured as a step down transformer, and when the bypass contactors are closed, to have a nominal input excitation current; and
wherein a reduced excitation current is established for the main transformer that is less by a factor of at least ten, and in response to the high-Z transformer being coupled in series with the main transformer.

11. An impedance control transformer assembly, comprising:
a high-Z transformer configured to be coupled to a main transformer that has a nominal impedance and is configured to be coupled to an electrical source and a distribution load;
bypass contactors coupled between the main transformer and the high-Z transformer, and configured when open to couple the transformer and the high-Z transformer in a series circuit that establishes a combined impedance exceeding the nominal impedance;
a current sensor configured to detect power demand of the distribution load; and
at least one processor coupled to the current sensor and the bypass contactors, and configured to actuate the bypass contactors responsive to detection of a power demand.

12. The impedance control transformer assembly according to claim 11, further comprising:
the at least one processor configured to open the bypass contactors when the distribution load is less than or equal to a predetermined threshold.

13. The impedance control transformer assembly according to claim 11, further comprising:
the main transformer is configured with an excitation current that is reduced responsive to the high-Z transformer being coupled in the series circuit with the main transformer.

14. The impedance control transformer assembly according to claim 11, further comprising:
the main transformer is configured to have a first excitation current when the bypass contactors are closed; and
wherein a second excitation current is established for the main transformer that is less than the first excitation current, responsive to the bypass contactors being opened and the high-Z transformer being coupled in the series circuit with the main transformer.

15. The impedance control transformer assembly according to claim 11, further comprising:
the main transformer is configured as a step down transformer and to have a nominal excitation current when the bypass contactors are closed to bypass the high-Z transformer; and
wherein a reduced excitation current is established for the main transformer that is less by a factor of at least ten, responsive to the bypass contactors being closed and the high-Z transformer being coupled in the series with the main transformer.

16. An impedance control transformer assembly, comprising:
a high-Z transformer configured to establish a combined impedance when coupled to a step down transformer that has a nominal impedance and is configured to be coupled to an electrical source and a distribution load;
bypass contactors coupled between the step down transformer and the high-Z transformer, and configured when closed to bypass the high-Z transformer and when open to couple the step down transformer and the high-Z transformer in a series circuit establishing the combined impedance;
a current sensor configured to detect a power demand of the distribution loads; and
one or more processors coupled to the current sensor and the bypass contactors, and configured to actuate the bypass contactors responsive to detection of power demand.

17. The impedance control transformer assembly according to claim 16, further comprising:
the one or more processors configured to actuate the bypass contactors to:
open when the detected power demand is less than a predetermined threshold, to establish a low power mode; and
close to bypass the high-Z transformer when the detected power demand equals or exceeds the predetermined threshold to establish a full power mode.

18. The impedance control transformer assembly according to claim 16, wherein:
the step down transformer and the high-Z transformer are configured as single-phase transformers having primary windings configured to be coupled to the electrical source and secondary windings configured to be coupled to the distribution load;
the current sensor is coupled to the secondary windings corresponding to the step down transformer; and
the bypass contactors include contactors coupled to the primary windings and the secondary windings of the step down transformer and the high-Z transformer.

19. The impedance control transformer assembly according to claim 16, wherein:
- the step down transformer is configured as a three-phase transformer configured to have primary windings for each phase configured to be coupled to the electrical source and secondary windings for each phase wherein at least one phase is configured to be coupled to the distribution load;
- the current sensors are coupled to the secondary windings for each phase of the step down transformer; and
- the bypass contactors include bypass primary and secondary winding contactors for each phase of the step down transformer.

20. The impedance control transformer assembly according to claim 16, wherein:
- the step down transformer is configured to have a nominal excitation current; and
- wherein a reduced excitation current is established that is less than the nominal responsive to the high-Z transformer being coupled in the series circuit with the step down transformer.

\* \* \* \* \*